F. O. HOAGLAND.
LEAD GAUGE FOR THREADS.
APPLICATION FILED MAR. 16, 1918.
1,434,699.
Patented Nov. 7, 1922.
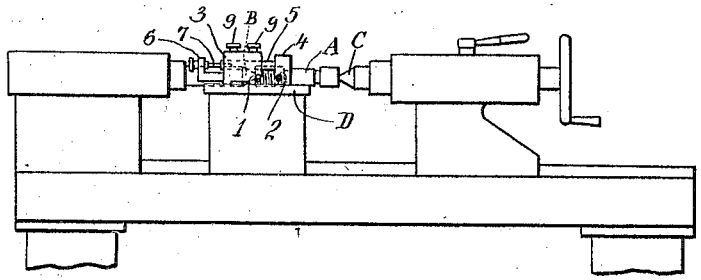
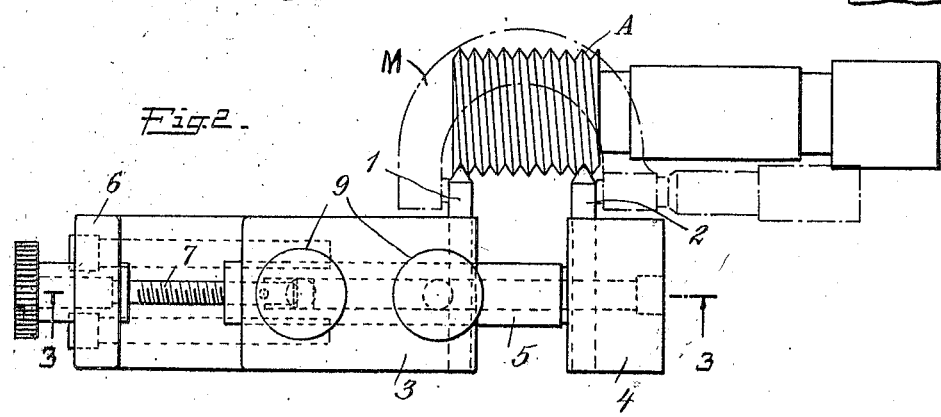
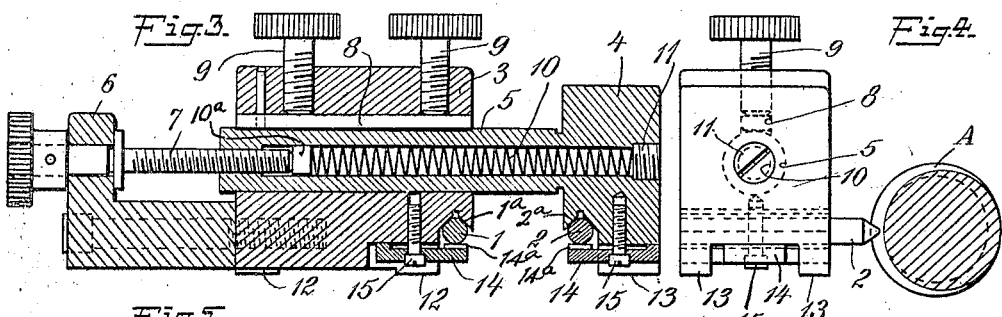
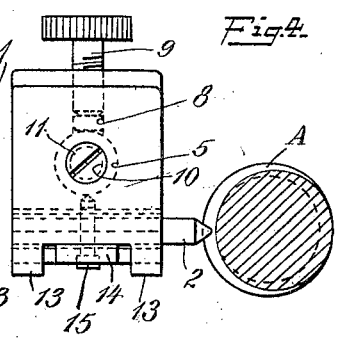
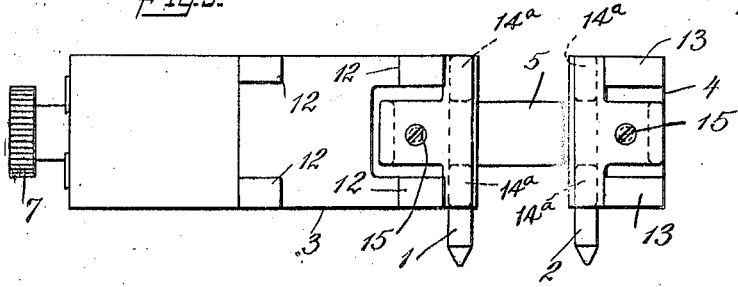
INVENTOR
Frank O. Hoagland
BY S. Jay Teller
ATTORNEY Patented Nov. 7, 1922.

1,434,699

UNITED STATES PATENT OFFICE.

FRANK O. HOAGLAND, OF HARTFORD, CONNECTICUT, ASSIGNOR TO PRATT & WHITNEY COMPANY, OF NEW YORK, N. Y., A CORPORATION OF NEW JERSEY.

LEAD GAUGE FOR THREADS.

Application filed March 16, 1918. Serial No. 222,863.

*To all whom it may concern:*

Be it known that I, FRANK O. HOAGLAND, a citizen of the United States, residing at Hartford, in the county of Hartford and State of Connecticut, have invented certain new and useful Improvements in Lead Gauges for Threads, of which the following is a specification.

The invention relates to a gauge which is adapted for easily and accurately measuring the lead of the threads on any externally threaded object, being capable of use for all kinds of threads and all diameters. The object of the invention is to provide means whereby the lead may be measured substantially directly with minimum opportunity for error.

In the accompanying drawing I have shown the embodiment of the invention which I now deem preferable, but it will be understood that changes and modifications may be made within the scope of the appended claims without departing from the spirit of the invention.

Of the drawing:

Fig. 1 is a view illustrating the manner of use of a gauge embodying the invention.

Fig. 2 is a plan view, on an enlarged scale, showing the gauge applied to the threads of a thread gauge.

Fig. 3 is a vertical sectional view taken along the line 3—3 of Fig. 2.

Fig. 4 is an end view.

Fig. 5 is a bottom view.

Referring to the drawing, it will be seen that the gauge comprises two parallel pins 1 and 2 having conical end parts each of which is adapted to enter and fit the groove between two adjacent thread convolutions.
The two pins are adjustable toward and from each other as required. The cylindrical body parts of the pins are accurately ground to a predetermined diameter and the distance between their outermost sides can be directly measured by a suitable measuring device, such as the micrometer calipers, M, indicated by dot-and-dash lines in Fig. 2. It will be obvious that the micrometer reading, minus the diameter of one of the pins, will be the exact distance between the two grooves being measured. By moving the pins to fit different grooves and by turning the threaded object as required, the thread may be thoroughly explored and any errors of pitch observed and measured.

The devices for holding and relatively moving the two pins 1 and 2 may vary widely, but I prefer devices such as shown in the drawing. As illustrated, the two pins are carried by supports 3 and 4 which comprise telescopically connected blocks, one of them having an extension 5 which projects through and fits an aperture in the other. Projecting horizontally from the support 3 is an arm 6 having an upturned end. This upturned end serves as a bearing for a screw 7 having threaded engagement with the end part of the extension 5. It will be clear that by turning the screw 7 the support 4 may be moved toward or away from the support 3. For locking the two supports in adjusted position there is provided a shoe 8 which engages the extension 5 and which is adapted to be firmly clamped against the extension by means of screws 9, 9 having knurled heads. Preferably, in order to take up any lost motion that may be present between the screw 7 and the extension 5, the extension and the support 4 are provided with a central longitudinal aperture in which is positioned a coil compressing spring 10. This spring abuts at its left-hand end against a block 10ª which is engaged by the screw 7 and abuts at its right-hand end against a screw 11 threaded into the end of the aperture in the support 4.

Preferably the supports 3 and 4 are provided with feet 12, 12 and 13, 13 which serve to hold the supports with their main bottom surfaces out of engagement with the surface on which the supports rest. For holding the respective pins the supports are provided respectively with downward opening notches 1ª and 2ª having oppositely inclined surfaces adapted to engage the upper surfaces of the pins. Each support is provided with a plate 14 adapted to engage the lower surface of the corresponding pin, this plate being held in position by a screw 15. Preferably each plate has bosses 14ª on its upper side so that it engages the corresponding pin at the ends only. It will be clear that by turning the screw 15 the plate may be loosened to permit the pin to be removed and another pin substituted.

Preferably, in using the gauge, a threaded object A to be gaged is mounted between suitable centers B, C, as shown in Fig. 1. A plate D is provided having its upper surface horizontal and at an elevation which is below the level of the axis of the centers by a distance equal to that between the axes of the pins and the bottom plane of the feet 12, 12 and and 13, 13. The result is that when the gauge is placed on the plate D the pins are held with their axes in the same horizontal plane as the axis of the threaded object A. The operator then carefully pushes the gauge against the threads, adjusting the distance between the pins so that they exactly enter and fit the grooves. In securing the adjustment the operator preferably makes use of a light or a white sheet of paper placed immediately beneath the pins, thus enabling him to observe accurately any failure of the pins to closely fit the surfaces of the grooves. After the adjustment has been secured the screws 9, 9 are tightened and, if necessary, a further test is made to make sure that the pins have not been disturbed by the clamping operation. Then by means of the micrometer, as indicated, the distance between the pins is measured and the diameter of one of the pins is subtracted from the reading. The resulting distance is compared with the true nominal distance between the grooves entered by the pins and the difference between these two distances is the error in the lead at the position of measurement.

It will be observed that inasmuch as the distance between the outer surfaces of the pins is measured at a position close to the points there is a minimum opportunity for error arising from any possible inaccuracy in the adjustment of the pins or in the construction of the other parts of the gauge. By modern methods it is possible to form the pins so accurately that any errors in their diameters or in the concentricity of the points with respect to the bodies of the pins will be entirely negligible. The other parts of the gauge are also accurately constructed, but it will be clear that a minor error, as for instance a slight deviation from parallelism between the two pins, would make practically no difference in the resulting measurement. If the pins are accurately formed as stated, the measurements taken by the micrometer calipers or other measuring device will be accurate within the limits of accuracy of the device used.

What I claim is:

1. In a gauge of the class described, the combination of two parallel pins each having a cylindrical body part accurately formed to a predetermined diameter and each having a conical end part concentric with the body part and adapted to exactly fit the groove between two thread convolutions, supports for holding the respective pins at the same distance from a common supporting surface, each support comprising a block having a downward opening V-shaped notch for receiving the corresponding pin and a plate for engaging the pin to hold it in place, and means for relatively adjusting the two supports to change the distance between the pins while maintaining them parallel.

2. In a gauge of the class described, the combination of two parallel pins each having a cylindrical body part accurately formed to a predetermined diameter and each having a conical end part concentric with the body part and adapted to exactly fit the groove between two thread convolutions, and relatively adjustable supports for holding the respective pins at the same distance from a common supporting surface, the said supports comprising blocks one of which has an extension projecting through and fitting an aperture in the other.

3. In a gauge of the class described, the combination of two parallel pins each having a cylindrical body part accurately formed to a predetermined diameter and each having a conical end part concentric with the body part and adapted to exactly fit the groove between two thread convolutions, relatively adjustable supports for holding the respective pins at the same distance from a common supporting surface, the said supports comprising blocks one of which has an extension projecting through and fitting an aperture in the other, and a screw carried by the apertured block and fitting the extension of the other block for relatively adjusting the supports.

4. In a gauge of the class described, the combination of two parallel pins each having a cylindrical body part accurately formed to a predetermined diameter and each having a conical end part concentric with the body part and adapted to exactly fit the groove between two thread convolutions, relatively adjustable supports for holding the respective pins at the same distance from a common supporting surface, the said supports comprising blocks one of which has an extension projecting through and fitting an aperture in the other, and means carried by the apertured block for engaging the extension of the other block to clamp the supports in adjusted position.

5. In a gauge of the class described, the combination of two parallel pins each having a cylindrical body part accurately formed to a predetermined diameter and each having a conical end part concentric with the body part and adapted to exactly fit the groove between two thread convolutions, relatively adjustable supports for holding the respective pins at the same distance from a common supporting surface, the said supports comprising blocks one of which has an extension projecting through and fitting an aperture in the other, a screw carried by the apertured block and fitting the extension of the other block for relatively adjusting the supports, and means to take up any lost motion between said supports.

6. In a gauge of the class described, the combination of two parallel pins each having a cylindrical body part accurately formed to a predetermined diameter and each having a conical end part concentric with the body part and adapted to exactly fit the groove between two thread convolutions, relatively adjustable supports for holding the respective pins at the same distance from a common supporting surface, the said supports comprising blocks one of which has an extension projecting through and fitting an aperture in the other, a screw carried by the apertured block and fitting the extension of the other block for relatively adjusting the supports, and resilient means to take up any lost motion between said supports.

In testimony whereof, I hereto affix my signature.

FRANK O. HOAGLAND.